United States Patent [19]

Gray

[11] 3,947,876

[45] Mar. 30, 1976

[54] DUAL DENSITY 800 bpi NRZI AND 1600 bpi PE READ CIRCUIT FOR A DIGITAL MAGNETIC TAPE TRANSPORT

[75] Inventor: Martin D. Gray, Sierra Madre, Calif.

[73] Assignee: C. J. Kennedy Company, Altadena, Calif.

[22] Filed: Jan. 6, 1975

[21] Appl. No.: 538,532

[52] U.S. Cl. .................. 360/40; 360/41; 360/42
[51] Int. Cl.² ................................ G11B 5/09
[58] Field of Search ............... 360/39, 40, 41, 42

[56] References Cited
UNITED STATES PATENTS 3,581,297   5/1971   Behr et al. .......................... 360/40

Primary Examiner—Vincent P. Canney
Attorney, Agent, or Firm—Fraser and Bogucki

[57] ABSTRACT

A dual density read circuit for a digital magnetic tape transport selectively responds to information recorded on magnetic tape in either an 800 bpi NRZI format or a 1,600 bpi phase encoded format. The read circuit includes a differentiating circuit coupled to differentiate and square the read head signal, a latch circuit coupled to latch an NRZI output data signal only when the differentiated read head signal has a change of polarity after being at a given polarity for a predetermined minimum period of time, and first and second gating circuits coupled to selectively pass the NRZI output data signal and the differentiated read head signal when enabled by NRZI and phase encoded read signals respectively. The read circuit advantageously uses common circuit components while providing excellent noise immunity for either the NRZI or phase encoded data formats.

21 Claims, 3 Drawing Figures

800 BPI NRZI

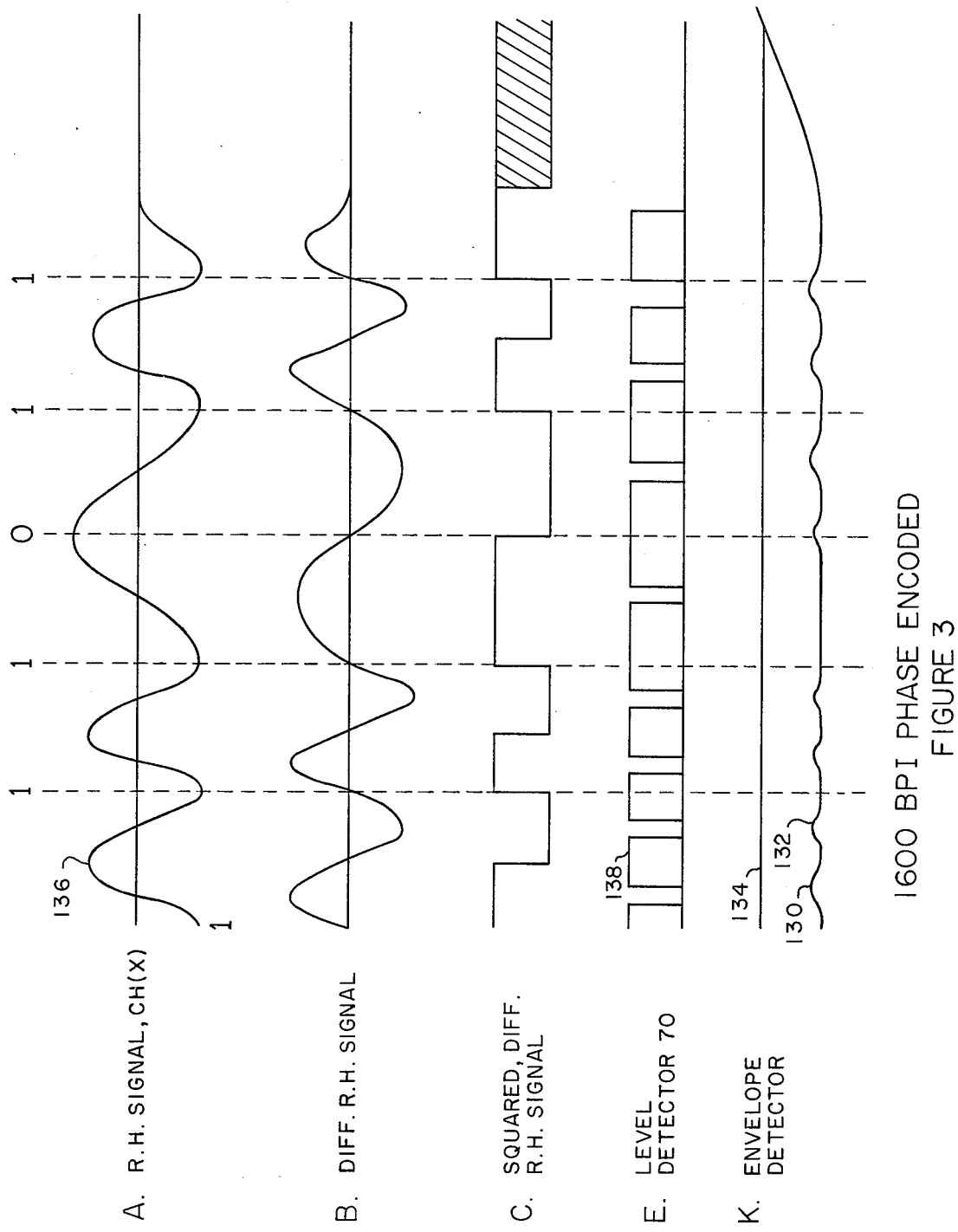

DUAL DENSITY 800 BPI NRZI AND 1600 BPI PE READ CIRCUIT FOR A DIGITAL MAGNETIC TAPE TRANSPORT

BACKGROUND OF THE INVENTION

1. Field of the Invention

This invention relates to a read circuit for a digital magnetic tape transport and more particularly to a dual density read circuit for reading data in either an 800 bpi NRZI format or a 1600 bpi phase encoded format.

2. Description of the Prior Art

Digital magnetic tape transports receive and store digital information in any one or more of a variety of formats and densities. A frequently offered tape transport arrangement is one in which information may be recorded or read in either an 800 bpi NRZI standard format or a 1600 bpi phase encoded format. Separate read circuitry is conventionally used for reading each recording format.

As information recorded in an 800 bpi NRZI format is being read from tape a pulse is generated on a read head signal for each occurrence of a one and no pulse is generated for the occurrence of a zero. A one pulse may be of either polarity and the polarity alternates for each occurrence of a one. Data bits have a nominal position spacing of 800 bits per inch on the magnetic tape with a flux transition occurring at each one bit position and no flux transition occurring at each zero bit position.

The 1600 bpi phase encoded recording format is considerably different from the 800 bpi NRZI format. The tape is divided into successive data bit intervals with a nominal density of 1600 data bit intervals per inch. A flux transition occurs at the boundary between each adjacent pair of data bit intervals with the polarity of the transition indicating a one or a zero. A phase transition may occur at the middle of a data bit interval where necessary to enable a subsequent data flux transition at the end of the interval to have a desired polarity.

SUMMARY OF THE INVENTION

A dual density read circuit for digital magnetic tape transports in accordance with the invention uses common circuitry for reading either 800 bpi NRZI or 1600 bpi phase encoded information with excellent noise immunity. The read circuit includes a differentiating circuit coupled to differentiate a read head signal and square the differentiated read head signal, a latch circuit coupled to latch an NRZI output data signal only when the differentiated read head signal has a change of polarity after being at a given polarity for a predetermined minimum period of time, and first and second gating circuits coupled to selectively pass the NRZI output data signal and the differentiated read head signal when enabled by NRZI and phase encoded read signals respectively.

The latching circuit includes a level detector and an EXCLUSIVE-OR gate which permits inversion of the differentiated read head signal when a negative NRZI pulse is being read. This selective inversion permits use of a polarity sensitive integrator which slowly integrates the leading edge of an NRZI data pulse to enable the latch only after the pulse is present for a minimum period of time and then rapidly resets at the trailing edge of the pulse. Improved noise discrimination is thus attained while reading NRZI data. While reading phase encoded data, an envelope detector circuit responds to the level detector to inhibit phase encoded data output if several data bit intervals pass without the occurrence of a flux transition. The generation of noise on the output data signal is thus prevented within an inter-record gap or in the event that there is a lapse of data on a given channel.

BRIEF DESCRIPTION OF THE DRAWINGS

A better understanding of the invention may be had from a consideration of the following detailed description taken in conjunction with the accompanying drawings in which:

FIG. 3 is a graphical representation of several signal waveforms which are helpful in understanding the operation of the read circuit shown in FIG. 1 when reading 1600 bpi phase encoded information.

DETAILED DESCRIPTION

Figure 1:
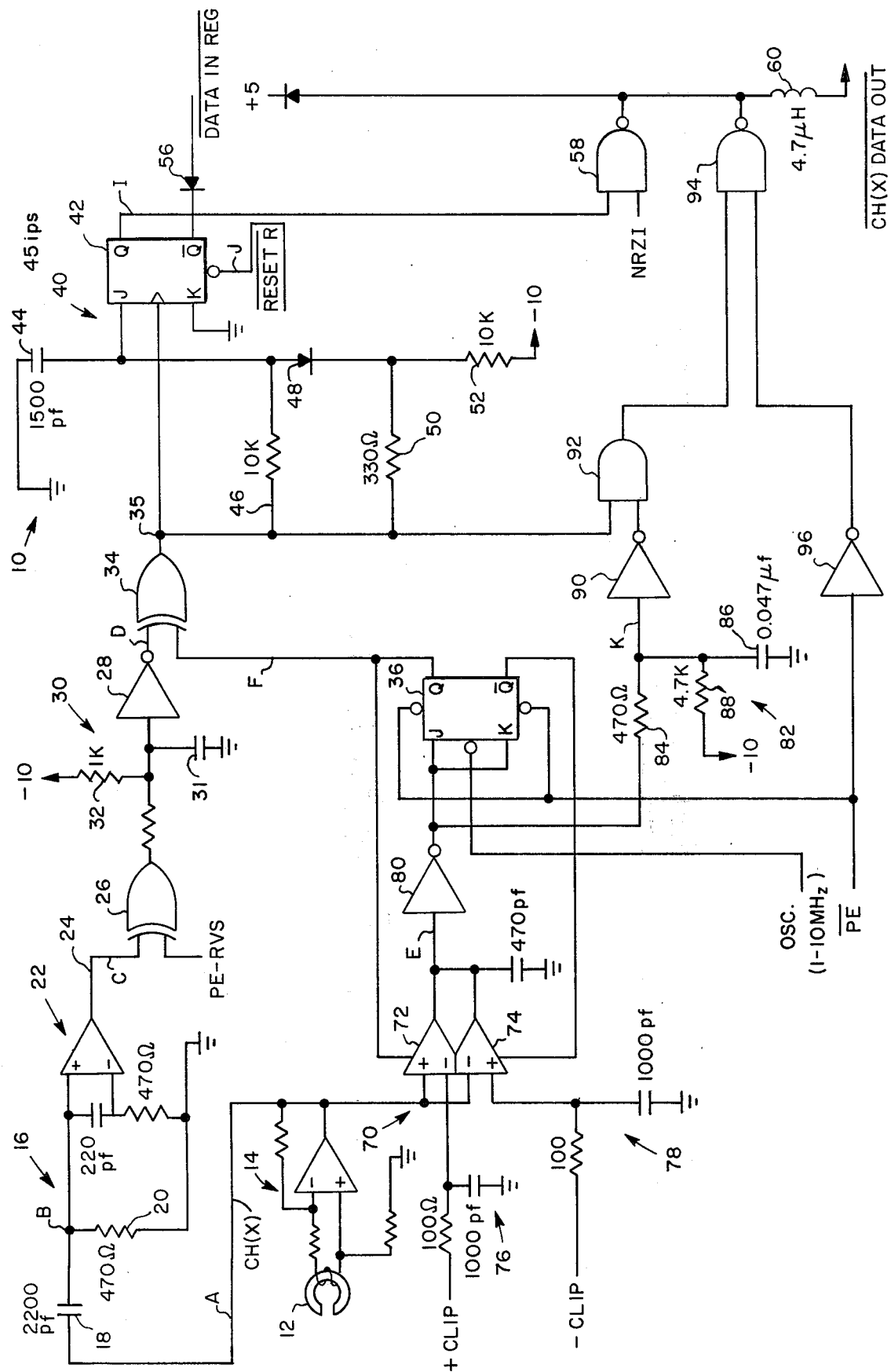
FIG. 1 is a schematic representation of a dual density read circuit for reading 800 bpi NRZI and 1600 bpi phase encoded data from digital magnetic tape.

A dual density read circuit 10 for a digital magnetic tape transport in accordance with the invention receives a read head signal designated CH(X) for one of a plurality of parallel channels from a read head transducer 12 and a preamp 14. The read head transducer 12 generates output pulses as flux transitions appear on magnetic tape moving relative thereto. Preamplifier 14 amplifies these output pulses to generate the read head signal, CH(X). While the read circuit 10 is suitable for operation at a variety of operating speeds with suitable adjustment of component values to account for different data rates, the particular read circuit 10 is presented by way of example for reading data in either an 800 bpi NRZI format or a 1600 bpi phase encoded format as tape moves passed the read head transducer 12 at a velocity of 45 inches per second.

The read circuit 10 includes a differentiating circuit 16 having a capacitor 18 with an input coupled to the read head signal, CH(X), and an output coupled through a resistor to ground. The output of capacitor 18 is also coupled to the input of a high gain squaring circuit 22 which amplifies and clips differentiated read head signals appearing at the output of the capacitor 18 to provide a squared, differentiated read head signal at an output 24 of squaring circuit 22. The essentially digital, but noisy, squared differentiated read head signal from output 24 is coupled to one input of an EXCLUSIVE-OR gate 26. EXCLUSIVE-OR gate 26 has a second input coupled to receive a PE-RVS signal which goes active or true to cause EXCLUSIVE-OR gate 26 to invert the squared, differentiated read head signal only when phase encoded information is being read while tape is moving in a reverse direction. Normally, EXCLUSIVE-OR gate 26 has substantially no effect upon the squared, differentiated read head signal. An inverter 28 has an input coupled through a low pass filter 30 having a 0.0022 μf capacitor 31 and a 1K resistor 32 to the output of EXCLUSIVE-OR gate 26 and an output coupled to a first input of a second EXCLUSIVE-OR gate 34. Inverter 28 has a Schmitt trigger input which causes the output to go low only when a signal at the input exceeds a first, relatively high voltage level of about 1.6 V and causes the output to return high only when a signal at the input drops below a second, relatively low voltage level of about 0.8 V. This hysteresis effect of inverter 28, coupled with filter 30 helps eliminate low amplitude noise signals superimposed upon a data signal to improve the noise discrimination of read circuit 10. The filter 30 imposes a minimum time of approximately 1/20 of a data bit period (the time between two adjacent data bits) between changes in the input. EXCLUSIVE-OR gate 34 has an output 35 and a second input 40 which is coupled to a Q output of a toggling flip-flop 36. The second input is utilized during the course of reading NRZI data to selectively invert the squared, differentiated read head signal so that the squared, differentiated read head signal appearing at output 35 of EXCLUSIVE-OR gate 34 is always at logic 1 or positive during the reading of the leading edge of an NRZI logic 1 pulse with a transition to logic 0 or zero volts during the reading of the trailing edge of a logic 1 NRZI pulse. During the course of reading phase encoded data, the second input of gate 34 remains continuously true or at a high voltage potential to cause EXCLUSIVE-OR gate 34 to invert the signal provided by inverter 28 and in effect nullify the inversion provided by inverter 28. Thus, the signal occurring at the output of EXCLUSIVE-OR gate 26 appears substantially unchanged, except for the noise discrimination provided by the filter 30 and Schmitt trigger input of inverter 28, at the output 35 of EXCLUSIVE-OR gate 34 during the course of reading phase encoded data.

An integrator circuit 40 has an input connected to receive signals appearing at output 35 of EXCLUSIVE-OR gate 34 and an output connected to drive a J input of a JK edge triggered flip-flop 42. Integrator circuit 40 includes a capacitor 44 having one terminal connected to ground and another terminal connected to the output of integrator circuit 40, through a resistor 46 to output 32, and also through a diode 48 and a resistor 50 to input 32. Diode 48 has an anode thereof coupled to capacitor 44 and a cathode coupled through a 10K resistor 52 to ground as well as through the 330 ohm resistor 50 to output 35.

Flip-flop 42 is a latching flip-flop which latches a logic 1 output data signal during the course of reading 800 bpi NRZI data. An inverting, edge triggered clock input to flip-flop 42 is connected to the output 35 of EXCLUSIVE-OR gate 34 and the K input is connected to ground. An inverting clear input to flip-flop 42 is connected for selective resetting of flip-flop 42 by a tape transport read register reset signal, $\overline{RESETR}$. The Q output of flip-flop 42 is coupled through an isolation diode 56 to provide a $\overline{DATA\ IN\ REG}$ signal which drives the appropriate channel input for a tape transport data in register (not shown). When reading NRZI data, a tape transport waits for a small, predetermined period of time after logic 1 data is first indicated by one of the channels, and then loads the state of a flip-flop 42 for each channel into an appropriate bit position of a data in register. A logic 0 is presumed for a given bit position on any channel for which the corresponding flip-flop 42 is not set. A NAND gate 58 has one input connected to the Q output of flip-flop 42 and a second input connected to receive an NRZI signal which indicates that a tape transport is reading data in an 800 bpi NRZI data format. When enabled by the NRZI signal, NAND gate 58 passes the Q output of flip-flop 42 through an inductor 60, which limits the rate of change of current to reduce ground noise to generate a $\overline{CH(X)}$ DATA OUT signal which goes low in response to the setting of flip-flop 42 to indicate to an associated tape transport that a logic 1 bit has been detected on the particular channel.

A level detector circuit 70 includes a first comparator 72 and a second comparator 74. A non-inverting input of comparator 72 is coupled to the read head signal while an inverting input is coupled through a low pass RC filter network 76 having a high cut off frequency to a signal + CLIP, which determines the detection level for comparator 72. Whenever the read head signal, CH(X), goes positive with a magnitude greater than the voltage of the + CLIP signal, the output of comparator 72, if enabled, goes to logic 1 or high to indicate the detection of a positive logic 1 NRZI data pulse. Similarly, comparator 74 has an inverting input coupled to the read head signal, CH(X), and non-inverting input coupled through an RC network 78 to a signal − CLIP. If enabled, comparator 74 generates a logic 1 or high output signal whenever the read head signal has a negative polarity and a magnitude greater than the magnitude of the voltage of signal − CLIP. The separate + and − CLIP signal inputs to level detector 70 permit the positive and negative detection levels to be separately selected and to be selectively changed for different operating conditions. For example, the detection levels might be set relatively high within an inter-record gap to provide greater noise immunity and then rapidly lowered within a fraction of a bit time once data is encountered to provide greater data sensitivity.

The use of the separate level sensing circuit 70 permits differentiation of the read head signal without prior clipping. Many conventional read circuits for NRZI recording permit only a portion of the read head signal which exceeds a threshold magnitude to be passed to the differentiator circuits. As a result, the time delay imposed by the differentiator circuits varies considerably with pulse magnitude and skew problems are increased. However, differentiator circuit 16 differentiates the read head signal itself and the time delay between read head signal pulse peaks and differentiated read head signals remains substantially constant.

The outputs of comparators 72 and 74 are coupled together and through an inverter 80 to the JK toggling inputs of flip-flop 36. A Q output of flip-flop 36 is coupled back to an enable input of comparator 72 and permits the output of comparator 72 to go to logic 1 only when the $\overline{Q}$ output of flip-flop 36 is at logic 1. Similarly, the Q output of flip-flop 36 is coupled back to an enable input of comparator 74 to permit the output of comparator 74 to go to logic 1 only when the $\overline{Q}$ output of flip-flop 36 is at logic 1. A complementing, edge triggered clock input to flip-flop 36 is coupled to a square wave signal, OSC, having a frequency which is preferably in the range of 5–10 MHz for 45 ips operation. During the course of reading NRZI data, and in the absence of an output from either of the comparators 72, 74, the output of inverter 80 is at logic 1 to enable the JK inputs to flip-flop 36 which successively toggles under control of clock signal OSC. At the occurrence of a logic 1 data pulse, the outputs of one of the comparators 72, 74 goes high to disable the toggle input of flip-flop 36 and prevent further toggling even though the clock signal continues. If flip-flop 36 is at state logic 1 at the time toggling ceases, only comparator 72 is enabled and a positive logic 1 data pulse has necessarily occurred. Similarly, if flip-flop 36 is at logic 0 at the time toggling ceases, only comparator 74 is enabled and a negative logic 1 pulse has necessarily occurred. If a positive logic 1 pulse occurs, this pulse is inverted by inverter 28, and then inverted again by EXCLUSIVE-OR gate 34 so that the squared, differentiated read head signal appearing at output 35 is positive during the reading of the leading edge of the pulse and then switches to logic 0 during the reading of the trailing edge. On the other hand, if a negative pulse is encountered, the squared, differentiated read head signal is inverted by inverter 28 and unchanged by EXCLUSIVE-OR gate 34 so that the signal appearing at output 35 is again a high or logic 1 signal at the leading edge of the read head pulse followed by a low or logic 0 signal at the trailing edge. Both complementing preset and complementing clear inputs to flip-flop 36 are coupled to a phase encoded signal, $\overline{PE}$, to constrain both the Q and $\overline{Q}$ outputs of flip-flop 36 to the true state during the reading of phase encoded information. Comparators 72 and 74 are thus both continuously enabled when reading phase encoded data and the second input to EXCLUSIVE-OR gate 34 is continuously enabled to nullify the inversion provided by inverter 28. The squared, differentiated read head signal thus appears substantially unchanged at output 35 during the course of reading phase encoded information unless the signal is inverted by EXCLUSIVE-OR gate 26 when the tape transport is operating in reverse.

An envelope detector 82 is coupled to the output of inverter 80 to go low when either positive or negative signals are encountered during the reading of phase encoded information. A 470 ohm resistor 84 is coupled between the input and output of envelope detector circuit 82 and the output is coupled through a 0.047 $\mu$f capacitor 86 to ground, through a 4.7K resistor 88 to a −10 volt source, and to the Schmitt trigger input of an inverter 90 which is identical to inverter 28. The time constant of envelope detector 82 is chosen such that the output goes low enough to trigger the Schmitt trigger input of inverter 90 only after two or three frames of data information have been encountered. Since 40 zeros occur in the preamble and postamble of each phase encoded format data block, there is no danger that data information will be lost during the two or three data frames required for the output of envelope detector 80 to go low enough to activate the Schmitt trigger input of inverter 90. The output of envelope detector 82 also goes high enough to activate the Schmitt trigger input of inverter 90 after the occurrence of two or three data frames without data information.

An AND gate 92 has one input connected to receive the squared, differentiated read head signal at output 32 of EXCLUSIVE-OR gate 30 and a second input coupled to the output of inverter 90. When enabled by envelope detection circuit 82, the output of inverter 90 goes high to enable AND gate 92 and pass the squared, differentiated read head signal to a NAND gate 94 which has an output connected to the output of NAND gate 58 and drives the $\overline{CH(X) \, DATA \, OUT}$ signal when enabled by the phase encode signal, PE, which is generated by the output of an inverter 96 having the input thereof connected to signal $\overline{PE}$.

Figure 2:
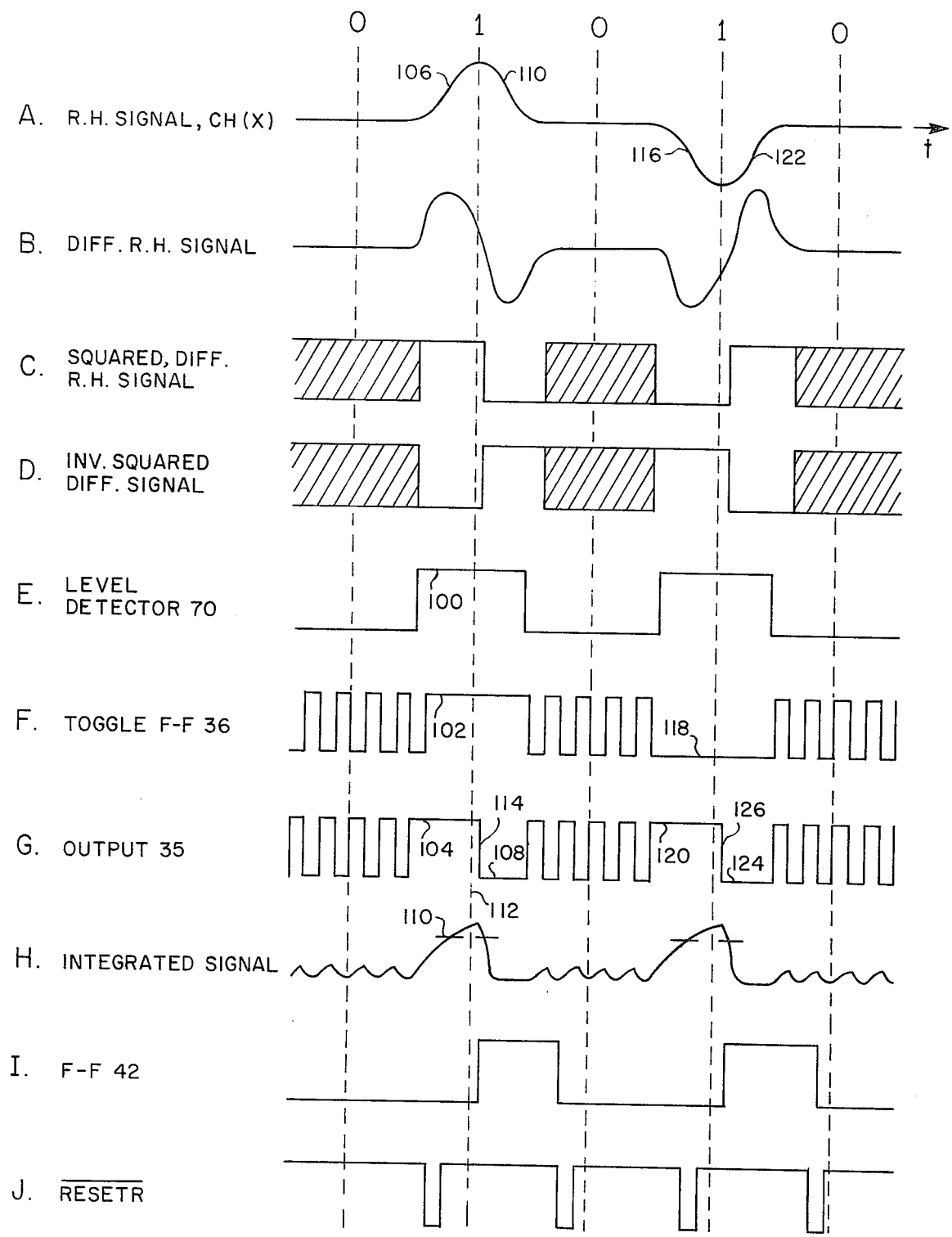
FIG. 2 is a graphical representation of several signal waveforms which are helpful in understanding the operation of the read circuit shown in FIG. 1 when reading 800 bpi NRZI data.

The operation of read circuit 10 when reading data information and 800 bpi NRZI data format may be further understood with reference to the waveforms shown in FIG. 2. Waveform A represents the read head signal CH(X) when reading the data information "01010". It will be observed that no pulse occurs at a zero bit, that a pulse occurs for a one bit and that the pulses for successive one bits are of alternating polarities. A one bit is deemed to occur at the peak of a one bit pulse. The differentiated read head signal at the output of differentiator circuit 16 is shown in curve B and the squared, differentiated signal appearing at output 24 of squaring circuit 22 is shown in curve C. The inverted squared differentiated signal at the output of inverter 28 is represented by curve D. It will be observed that considerable noise may appear on the squared, differentiated signal represented by curve C between logic 1 data pulses but that the Schmitt trigger input to inverter 28 and filter 30 limit the rate of transitions in the output of inverter 28, as represented by curve D. At least 1/20th of a bit time interval must occur between successive transitions. The output of level detector circuit 70 and the Q output of toggle flip-flop 36 are indicated by waveforms E and F respectively. During the course of reading the first logic 0 bit, the read head signal remains at a 0 voltage level, level detector 70 generates no output and flip-flop 36 continues to toggle. (For purposes of clarity the toggling frequency is represented in curves F, G and H as being much slower than the recommended frequency.) Upon encountering a positive polarity one bit, the positive input to comparator 72 becomes greater than the negative input and as soon as flip-flop 36 toggles to the set state, comparator 72 becomes fully enabled and generates a logic 1 output indicated at portion 100 of curve E. The logic 1 output at 100 drives the output of inverter 80 to logic 0 to inhibit further toggling of flip-flop 36 which remains in the set state as indicated at portions 102 of curve F. The Q output of flip-flop 36 drives the second input of EXCLUSIVE-OR gate 34 active to invert the signal represented by waveform D to generate the signal at output 35 which is represented by waveform G and is at logic 1 or high at portion 104 during the reading of a leading edge 106 of the logic 1 positive pulse on read head signal CH(X) and is low or at logic 0 as indicated by portion 108 during the reading of a trailing edge 110 of a positive logic 1 pulse on the read head signal. Integrator circuit 40 provides further noise immunity by integrating the signal appearing at output 35 to drive the J input of flip-flop 42 with a signal which gradually increases in magnitude until an activation threshold indicated by line 110 is crossed prior to the occurrence of a high to low transition in output signal 35. At time 112, a high to low transition 114 occurs in the signal at output 35 to clock flip-flop 42 to the set state and the low signal at output 35 causes capacitor 44 to rapidly discharge through diode 48 and the relatively small resistor 50. Integrator circuit 40 clamps the signal at output 35 slightly negative during the trailing edge 110 of the logic 1 read head pulse until the pulse diminishes in magnitude to a point below the detection level and comparator 72 becomes disabled. Flip-flop 36 then begins toggling again and the signal at output 35 of EXCLUSIVE-OR gate 34 tends to toggle with flip-flop 36. Each time the signal at output 35 goes positive integrating capacitor 44 starts to charge toward a positive voltage, but the rapid clocking of flip-flop 36 always causes the signal at output 35 to return low and reset integrator circuit 40 before the output thereof becomes sufficiently positive to activate the J input to flip-flop 42. Because the toggling frequency of flip-flop 36 is higher than the maximum frequence of the output of inverter 28, there is no chance that the two inputs to EXCLUSIVE-OR gate 34 can become synchronized out of phase between data pulses and cause integrator circuit 40 to generate an improper threshold magnitude voltage. Upon the occurrence of a logic 1 negative pulse having a leading edge 116, operation of read circuit 10 is substantially the same as for a positive pulse, except that flip-flop 36 ceases toggling in the reset state as indicated in portion 118 of curve F and the signal appearing at the output of inverter 28 passes through EXCLUSIVE-OR gate 34 without inversion. The signal at output 35 of EXCLUSIVE-OR gate 34 is thus again positive during the leading edge 116 of the logic 1 pulse as indicated at portion 120 of curve G and negative during the trailing edge 122 of the logic 1 pulse as indicated at portion 124 of curve G. The integrating circuit 40 thus operates in a similar manner to charge the J input of flip-flop 42 up to an activating voltage prior to the occurrence of a transition 126 at output 35 which clocks flip-flop 34 to the set state. The Q output of flip-flop 42 is indicated at curve I. Once set, flip-flop 42 remains set until the occurrence of a reset signal which is generated by the tape transport after reading information thereof. The reset signal is indicated by curve J.

A more complete understanding of the operation of the read circuit 10 while reading information from magnetic tape which is recorded in a phase encoding format may be better understood from a consideration of the waveforms shown in FIG. 3. Phase encoded information is recorded on magnetic tape in approximately uniform data frame intervals at a density of 1600 data frame intervals per inch on each track. A flux transition occurs at each boundary between adjacent pairs of data frame intervals with a high to low flux transition indicating a one bit and a low to high flux transition indicating a zero bit. In order to provide the proper polarity of flux transition at the boundary between adjacent data frame intervals, an additional phase flux transition must occur near the center of a data frame interval whenever the same data information bit occurs at both boundaries of an interval. As shown in curve A, a high to low flux transition results in negative peak for each one bit and a low to high flux transition results in a positive peak for each zero bit. When the read head signal is differentiated as shown in curve B and then squared as shown in curve C, the voltage of the squared, differentiated read head signal goes from low to high at each occurrence of a one bit and from high to low at each occurrence at a zero bit. The squared, differentiated read head signal, which is represented by curve C, provides the basic data out signal which may be further processed by circuitry not shown to convert the positive and negative data transitions to binary ones and zeros respectively.

During the course of reading phase encoded information, both the preset and clear inputs to flip-flop 36 are activated, causing both the Q and $\overline{Q}$ outputs to go high. Both comparator 72 and comparator 74 are thus continuously enabled and the level detector output, which is represented by curve E, goes high at each occurrence of either a positive or negative pulse on the read head signal. The output of the level detector 70 is thus high most of the time and the output of inverter 80 is thus driven low most of the time when data is being read. Envelope detector 82 is essentially an integrating circuit with a relatively long time constant. In the absence of a data pulse, for instance within an interrecord gap, the output of level detector 70 is low and the output of inverter 80 is high to drive the output of envelope detector 70 high and trigger the output of inverter 90 low to disable AND gate 92. Any noise appearing on the differentiated read head signal is thus prevented from passing to the output. Upon reaching a preamble, a sequence of 40 zeros followed by a one is encountered. The pulses on the read head signal which represent the zeros cause the output of level detector 70 to become active and drive the input to envelope detector 82 low. After two or three data frame intervals the output of level detector 82 becomes sufficiently low to trigger inverter 90 and enable the passage of data information to the output through AND gate 92. Between each data pulse on the read head signal the output of inverter 80 goes high and the output of the envelope detector 82 begins to charge positively as representatively indicated at small pulses 130 and 132 toward the Schmitt triggering level of inverter 90 which is represented by line 134. However, before the output of envelope detector 82 can reach the trigger level 134, a new pulse such as phase transition pulse 136 occurs to cause a pulse 138 at the output of level detector 70 to drive the output of envelope detector 82 low before the pulse 130 reaches a magnitude sufficient to trigger the input to inverter 90. Only after data pulses have been absent for a period of time equal to two or three data frame intervals can the output of envelope detector 82 charge sufficiently positive to trigger the output of inverter 90 to logic 0 state and inhibit the further passage of data. Envelope detector 82 thus inhibits the occurrence of any noise on the data out signal within the interrecord gap without interference with the detection of data within a data block.

When reading tape backwards in a phase encoded format, high to low flux transitions, which create a negative peak on the read head signal for a one bit in the forward direction, appear as low to high flux transitions and create a positive peak at a one bit when reading tape in the reverse direction. This inversion of the read head signal also causes the differentiated read head signal represented by curves B and C to be inverted. For this reason, a phase encode reverse signal, PE-RVS, drives a second input to EXCLUSIVE-OR gate 26 to reinvert the squared, differentiated read head signal so that at the output of EXCLUSIVE-OR gate 26 the squared, differentiated read head signal always has the same polarity with a low to high transition representing a one and a high to low transition representing a zero. It thus becomes possible for the same circuitry to process the squared, differentiated read head signal to detect binary zeros and ones regardless of tape direction.

While there has been shown and described above a particular arrangement of a read circuit for a digital magnetic tape transport for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. A read circuit for a digital tape transport comprising:
    a differentiator connected to receive a read head signal and generate a differentiated read head signal as an output;

an integrator circuit which is biased toward a predetermined no signal condition, the integrator circuit being connected to integrate the differentiated read head signal and generate an integrated differentiated read head signal as an output;

a latch connected to generate a latched first output signal when a transition occurs in the differentiated output signal while the integrated differentiated read head signal exceeds a selected threshold magnitude with respect to the no signal condition;

a gating circuit coupled to pass the differentiated read head signal as a second output signal when enabled; and an envelope detector coupled to enable the gating circuit when the time between successive read head pulses of predetermined minimum magnitudes does not exceed a selected minimum time.

2. The read circuit according to claim 1 above, wherein the output of the integrator circuit is biased toward a first digital logic voltage level and moves toward a second digital logic voltage level when the differentiated read head signal indicates the leading edge of a logic "1" NRZI data signal.

3. The read circuit according to claim 2 above, wherein the latch is a flip-flop having a data input responsive to the output of the integrator and a clock input responsive to a transition of the differentiated read head signal.

4. The read circuit according to claim 3 above, further comprising a squaring circuit coupled between the differentiator and the integrator to drive the integrator with a squared differentiated signal.

5. The read circuit according to claim 4 above, further comprising an inverter circuit coupled to selectively invert the squared differentiated signal to always drive the integrating circuit with the same polarity signal at the leading edge of a logic "1" NRZI data signal and an opposite polarity signal at the trailing edge of a logic "1" NRZI data signal.

6. The read circuit according to claim 5 above, wherein the integrator circuit integrates the selectively inverted differentiated output of the inverter at the leading edge of a logic "1" NRZI data signal to drive the input of the flip-flop with a logic "1" data level at the time a transition occurs in the differentiated read head signal to clock the flip-flop.

7. The read circuit according to claim 5 above, wherein the inverter circuit includes a bipolar level detector circuit, a toggle flip-flop which is connected to successively toggle in the absence of an output from the level detector circuit and an EXCLUSIVE-OR gate having one input responsive to the squared differentiated read head signal, a second input responsive to an output of the toggle flip-flop and an output coupled to drive the integrator circuit, the level detector being coupled to generate an output when the read head signal exceeds first or second magnitudes with first or second polarities while the level detector is enabled by first or second output signals of the toggling flip-flop respectively.

8. The read circuit according to claim 5 above, further comprising a filter circuit coupled in series between the squaring circuit and the integrating circuit, the filter circuit having an output which changes in response to an input with a predetermined minimum time between successive changes in the output, and wherein the toggle flip-flop is connected to toggle sufficiently fast that more than two changes must occur in the output of the toggle flip-flop for every change in the output of the filter circuit.

9. The read circuit according to claim 1, further comprising a gate coupled to selectively pass the differentiated read head signal as output data only when enabled by a phase encode read enable signal which indicates that information is to be read from magnetic tape in a phase encoded format.

10. The read circuit according to claim 9 above, further comprising an envelope detector coupled to inhibit the differentiated read head signal in the absence of the reading of information having the same general frequency and magnitude as phase encoded data.

11. The read circuit according to claim 5 above, wherein the inverter circuit includes a pair of opposite polarity level detector circuits which are separately enableable, each being connected to generate an output when the read head signal exceeds a selected clipping level while enabled, the two outputs being logically ORed, and a toggling flip-flop connected to toggle in the absence of an output from the level detector circuits and to cease toggling in response to an output from the level detector circuits, the toggling flip-flop having one output coupled to enable one inverter circuit and one level detector and an inverted output opposite the one output coupled to enable the other level detector, the toggling flip-flop being further coupled to activate both outputs in response to a phase encode signal indicating that information is to be read from magnetic tape.

12. The read circuit according to claim 11 above, further comprising a first output gating circuit coupled to pass the latched output signal only in response to an NRZI signal and a second gating circuit coupled to pass the differentiated read head signal only in response to a phase encode signal which indicates phase encoded data is being read.

13. The read circuit according to claim 1 above, further comprising a digital logic element coupled between the differentiator and the integrator circuit, the digital logic element having an output and a Schmitt trigger input which controls the output thereof and permits the output to respond to a low to high input change only when the input exceeds a first, relatively high, threshold and permits the output to respond to a high to low input change only when the input decreases below a second, relatively low, level.

14. The read circuit according to claim 13 above, further comprising a low pass filter having an input coupled to receive the differentiated read head signal and an output connected to the Schmitt trigger input of the digital logic element.

15. A read circuit for selectively processing phase encoded and NRZI information generated by a read head of a digital magnetic tape transport, the read circuit comprising:

a differentiating circuit connected to receive and differentiate a read head signal;

a squaring circuit connected to receive and square the differentiated read head signal;

a first EXCLUSIVE-OR gate having one input coupled to receive the squared differentiated signal, a second input coupled to receive a reverse signal which indicates that reading is occurring in a phase encoded format while tape is moving backwards, and an output;

a first inverter having an input coupled to the output of the first EXCLUSIVE-OR gate and an output;

a second EXCLUSIVE-OR gate having a first input coupled to the first inverter, a second input connected to a Q output of a toggling flip-flop and an output;

an intergrating circuit coupled to integrate a signal output by the second EXCLUSIVE-OR gate and generate an integrated differentiated read head signal as an output;

a latching flip-flop connected to latch a logic 1 data signal when clocked by a high to low transition of a signal output by the second EXCLUSIVE-OR gate while the integrated differentiated read head signal exceeds a selected threshold, the latching flip-flop being further coupled to be reset by a reset signal;

a first gating circuit coupled to pass an output from the latching flip-flop only when enabled by an NRZI signal indicating that information is being read from magnetic tape in an NRZI format;

a level detector circuit connected to generate an output signal when a read head signal exceeds a first threshold magnitude with a first polarity while enabled by a Q output of a toggling flip-flop and to generate an output signal when a read head signal exceeds a second threshold magnitude with a second polarity while enabled by a $\overline{Q}$ output of a toggling flip-flop;

a toggling flip-flop connected to successively toggle in the absence of an output signal from the level detector circuit, the toggling flip-flop having a Q output coupled to enable first polarity level detection by the comparator circuit and also coupled to the second input of the second EXCLUSIVE-OR gate and a $\overline{Q}$ output coupled to enable second polarity level detection by the level detection circuit; the toggling flip-flop having both its Q and $\overline{Q}$ outputs active in response to a phase encode signal which indicates the reading of information from magnetic tape in a phase encoded format;

an envelope detector coupled to indicate by an output signal the appearance of signals at the output of the level detector which are consistent with the reading of phase encoded data from magnetic tape;

and a second gating circuit coupled to pass signals appearing at the output of the second EXCLUSIVE-OR gate only when enabled by an output signal from the envelope detector and by the phase encode signal.

16. The read circuit according to claim 15 above, wherein the integrator circuit includes a capacitor which is connected to charge relatively slowly in response to a logic one output from the second EXCLUSIVE-OR gate and discharge relatively rapidly in response to a logic zero output from the second EXCLUSIVE-OR gate.

17. A read circuit for selectively reading information from digital magnetic tape which is recorded in either a standard 1600 bpi phase encoded format or a standard 800 bpi NRZI format, the read circuit comprising: a differentiating circuit coupled to differentiate a read head signal and generate a differentiated read head signal as an output; a latch circuit coupled to generate and hold an NRZI output data signal when the differentiated read head signal changes polarity after assuming a given polarity for at least a predetermined minimum period of time, the latch being selectively cleared by a reset signal; the output of the latch being available as an NRZI data signal and the differentiated read head signal being available as a phase encoded data signal.

18. The read circuit according to claim 17 above, wherein the differentiator circuit includes a high gain amplifier which amplifies and clips the derivative of the read head signal before outputting the amplified and clipped derivative as the differentiated read head signal.

19. The read circuit according to claim 18 above, further comprising a first gating circuit coupled to pass the NRZI output data signal only when enabled by an NRZI signal indicating the reading of data in an 800 bpi NRZI format and a second gating cirucit coupled to pass the differentiated read head signal only when enabled by a phase encode signal indicating the reading of data in a 1600 bpi phase encoded format.

20. A read circuit for use in a digital magnetic tape transport having a read head which detects flux transitions on magnetic tape, the read circuit comprising:

a differentiator responsive to a read head signal which generates a differentiated read head signal as an output;

a gating circuit having first and second inputs and an output generating a binary output signal which changes with each change of one of the first and second inputs relative to the other, the first input being a Schmitt trigger input which changes from low to high at a first, relatively high threshold, and changes from high to low at a second, relatively low threshold;

a filter having an input coupled to receive the differentiated read head signal and an output coupled to drive the first input of the gating circuit, the filter circuit permitting successive changes in the first input only with a predetermined minimum time therebetween, means for changing the second input at a sufficiently high rate that at least two changes in the second input occur for each change in the first input;

means for inhibiting changes in the second input during the occurrence of a data pulse on the read head signal;

an integrator circuit coupled to receive and intergrate the binary output signal from the gating circuit, the integrator circuit generating an integrated, differentiated read head signal as an output;

a latch coupled to be set at the occurrence of a transition of the binary output signal from the gating circuit when the magnitude of the integrated differentiated read head signal is greater than a predetermined threshold magnitude.

21. The read circuit according to claim 20 above, wherein the filter permits successive changes in the first input only with a predetermined minimum time of at last one-twentieth of the nominal time between adjacent data bits.

* * * * *

UNITED STATES PATENT AND TRADEMARK OFFICE
CERTIFICATE OF CORRECTION

PATENT NO. : 3,947,876
DATED : March 30, 1976
INVENTOR(S) : Martin D. Gray

It is certified that error appears in the above—identified patent and that said Letters Patent are hereby corrected as shown below:

Column 4, line 50, after "the" and before "output", "Q" should read --$\overline{Q}$--. Column 10, line 38, after "read" and before the period ("."), insert --when enabled by an envelope detector--.

*Signed and Sealed this*

*fifteenth* Day of *June 1976*

[SEAL]

Attest:

RUTH C. MASON
*Attesting Officer*

C. MARSHALL DANN
*Commissioner of Patents and Trademarks*